Oct. 25, 1960  J. R. BRAY ET AL  2,958,008
CONTROL CIRCUIT
Filed Aug. 14, 1959
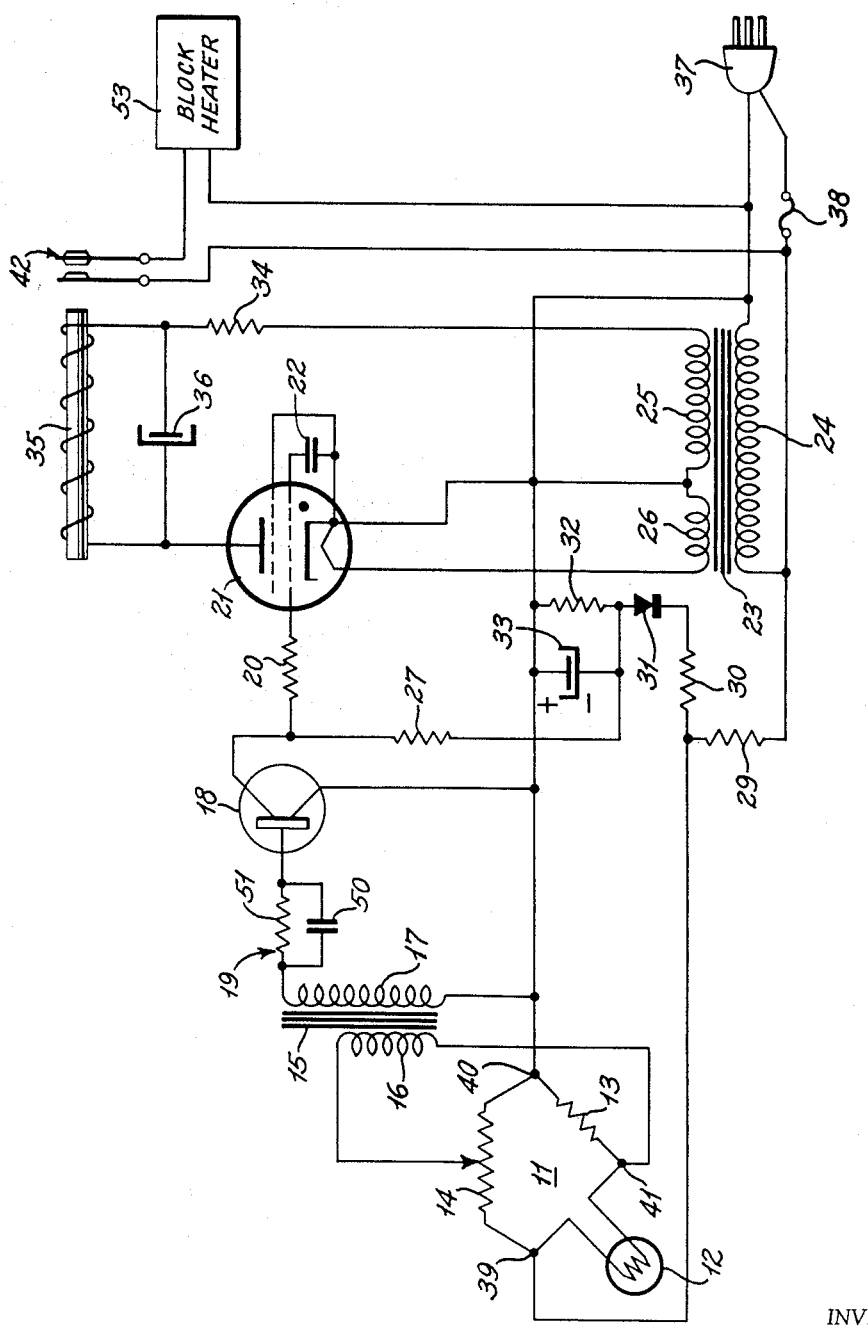
INVENTORS
John R. Bray
and Thomas W. McGlaughlin
BY
Robert L. Broad, Jr.
ATTORNEY United States Patent Office 2,958,008
Patented Oct. 25, 1960

2,958,008

CONTROL CIRCUIT

John R. Bray and Thomas W. McGlaughlin, Pensacola, Fla., assignors to The Chemstrand Corporation, Decatur, Ala., a corporation of Delaware Filed Aug. 14, 1959, Ser. No. 833,830

3 Claims. (Cl. 315—194)

This invention relates to a circuit which controls the opening and closing of a switch in response to a change in temperature.

The process of hot drawing of nylon yarn requires an accurate control of the temperature of the yarn. In this process the yarn is drawn over a block which is maintained at the desired temperature. The present invention provides an improved system for maintaining the block at the desired temperature to an accuracy of plus or minus ½° C.

One of the objects of this invention is to provide a novel and improved control circuit.

Another object of this invention is to provide a system for controlling a heater to maintain a predetermined temperature.

A further object of this invention is to provide a system having a temperature sensing bridge adapted to control a heater to maintain a predetermined temperature.

Still another object of this invention is to provide a temperature sensing bridge coupled to a transistor amplifier for generating a heater control signal in response to temperature.

According to the system of the present invention, a temperature sensitive element senses the temperature of the block. An output signal derived from the temperature sensitive element is amplified and used to control a relay which in turn controls a heater supplying heat to the block. When the temperature drops a half a degree below the desired temperature, the system will cause the heater to be turned on and when the temperature of the block rises a half a degree above the desired temperature, the system will cause the heater to be turned off.

The circuit of the invention employs a thermistor to sense the temperature of the block. The thermistor is connected in a bridge circuit across which A.C. power is applied. An A.C. output signal is derived from the bridge. This A.C. signal is stepped up by a transformer and amplified by a transistor amplifier and applied to the control grid of a thyratron. The thyratron has an A.C. signal applied between its cathode and plate. The A.C. signal derived from the bridge circuit will have one phase when the temperature is below a selected control point and will have the opposite phase when the temperature is above the control point. When the temperature is at the control point, the signal will be null. When the amplified signal applied to the grid of the thyratron is in phase with the power applied between the plate and cathode of the thyratron, the thyratron will fire. When the signal applied to the control grid of the thyratron is of the opposite phase from the signal applied between the plate and cathode, the thyratron will not fire. The thyratron controls the relay, which in turn controls the heater supplying heat to the block.

With this circuit a high degree of sensitivity is achieved. The only circuits of the prior art which provide a corresponding sensitivity require at least twice as many components and therefore are more expensive to produce, are heavier and take up more space.

In order for the circuit to operate properly, the amplified signal applied to the control grid of the thyratron must be applied in alignment with the signal applied between the plate and cathode. For, if the signal applied to the grid is lagging or leading the signal applied between the plate and cathode, the thyratron will not fire at the proper times. A phase shifting network is provided in the input of the amplifier to provide this phase alignment.

Further objects and advantages of the invention will become apparent as the following description of a preferred embodiment unfolds and when taken in conjunction with the single figure of the drawings, which is a schematic illustration of the circuit of the invention.

In the following description the specific circuit with specific values of the components for the preferred embodiment is set forth. These specific values as well as the circuit itself, of course, may be varied considerably from the specific embodiment described below.

In the figure the reference number 12 designates the thermistor which senses the temperature of the block. The output signal derived from the thermistor 12 is amplified and used to control the relay designated by the reference number 35. The relay contacts designated by reference number 42 turn the heater 53 off and on in response to the temperature of the block rising and falling past the desired temperature. The heater 53 supplying heat to the block thus maintains temperature of the block precisely within a half a degree of the desired temperature.

As shown in the drawing, the thermistor 12 connected between terminals 39 and 41 forms one leg of a bridge 11. A 600 ohm resistor 13 connected between terminals 40 and 41 forms a second leg of the bridge. The third and fourth legs of the bridge are formed by a 1000 ohm potentiometer 14 connected between the terminals 39 and 40. The terminals 39 and 40 form two diagonal points of the bridge and terminal 41 and the movable tap of the potentiometer 14 form the other two diagonal points of the bridge. An A.C. 60 cycle signal obtained from plug 37 is applied across the terminals 39 and 40. This signal is applied through fuse 38 and a 7000 ohm resistor 29. The input power from the plug 37 is 115 volts. The resistor 29 together with the bridge 11 operates as a voltage divider to provide a voltage across terminals 39 and 40 of about 6 to 8 volts. The resistance of the thermistor 12 changes with temperature. With this arrangement a temperature-sensitive A.C. signal will be generated between the terminal 41 and the movable tap of the potentiometer 14, these being the output terminals of the bridge 11. At a given setting of the movable tap, a null signal will be produced between the terminal 41 and the movable tap for a certain temperature, which shall be referred to as the control point. If the temperature rises above this control point, an output signal of one phase will be generated between the terminal 41 and the movable tap and, if the temperature is below this control point, a signal of the opposite phase will be generated between the terminal 41 and the movable tap. The control point can be varied up or down simply by adjusting the movable tap of the potentiometer 14.

The output signal generated between the movable tap of the potentiometer 14 and the terminal 41 is applied across primary winding 16 of a transformer 15, which has a 14 to 1 voltage step-up ratio. The output signal generated from a secondary winding 17 of the transformer 15 is applied between the base and emitter of a PNP transistor 18. This output signal from the secondary winding 17 is applied through a phase shifting network 19 connected in series with the base of the transistor 18. The phase shifting network 19 comprises a capacitor 50 connected in parallel with a 39 kilohm resistor 51.

The transistor 18 is connected as an amplifier. A D.C. voltage is applied between the collector and emitter of the transistor 18 from a charged capacitor 33 through a 5100 ohm load resistor 27. The capacitor 33 is shunted by a 5100 ohm resistor 32 and is charged from the 115 volt 60 cycle supply at the plug 37 through the resistor 29, a 100 ohm resistor 30 and a rectifier 31. The signal generated in the secondary winding 17 of the transformer 15 will be amplified by the transistor 18. The amplified output signal is generated at the collector of the transistor 18. This amplified output signal is applied to the control grid of a thyratron tube 21 through a 100 kilohm resistor 20.

A.C. power is applied between the plate and cathode of the thyratron 21 from a transformer 23. The 115 volt 60 cycle supply voltage at the plug 37 is applied across a primary winding 24 of the transformer 23 through the fuse 38. The transformer 23 has two secondary windings 25 and 26 which are connected together at one end. The winding 25 is designed to generate a 115 volt, 60 cycle output and the winding 26 is designed to generate a 6.3 volt, 60 cycle output. The junction between the windings 25 and 26 is connected to the cathode of the thyratron 21 and the other end of the secondary winding 25 is connected to the plate of the thyratron 21 through a 100 ohm resistor 34 and the winding of the relay 35. These connections provide the A.C. voltage between the plate and cathode of the thyratron 21. The winding of the relay 35 has a resistance of 5000 ohms. This winding is shunted by a three-microfarad capacitor 36. The secondary winding 26 of the transformer 23 is connected across the cathode heater of the thyratron 21. A 220 micro-microfarad capacitor 22 connects the control grid of the thyratron to the cathode of the thyratron.

The terminal 40, one side of the secondary winding 17 of the transformer 15, the emitter of the transistor 18, one side of the capacitor 33, the common junction of the secondary windings 25 and 26 of the transformer 23, one end of the primary winding 24 of the transformer 23, and one side of the power supply at the plug 37 are all connected together to provide a common reference point for the entire circuit.

When the amplified output signal from the transistor 18 applied to the control grid of the thyratron 21 is in phase with the A.C. signal applied between the plate and cathode of the thyratron 21, the thyratron 21 will then fire on every positive half cycle of the A.C. signal. When the thyratron 21 fires, current will flow through the winding of the relay 35, thus energizing it and closing relay contacts 42. The thyratron will stop conducting on each negative half cycle because the voltage between the plate and cathode will reverse. However, the relay 35 will remain energized because the capacitor 36 will charge up and maintain the current through the winding of relay 35 during each negative half cycle of the signal. As soon as the amplified voltage applied to the control grid of the thyratron 21 drops to zero or reverses its phase, the thyratron 21 will stop firing and current will stop flowing through the winding of the relay 35, which accordingly will be deenergized. When the amplified voltage applied to the control grid of the thyratron is of the opposite phase from the signal across the cathode and plate, the thyratron will not fire because, when the voltage between the plate and cathode is positive, the voltage applied to the grid will be negative and vice versa.

It will now be apparent why the signal applied to the grid of the thyratron must be precisely aligned with the signal applied between the plate and cathode of the thyratron. If these signals are not precisely aligned, then, when the signal applied to the grid of the thyratron 21 is supposed to be of the opposite phase from the signal across the plate and cathode, a part of the signal applied to the grid will be positive when the signal across the plate and cathode of the thyratron 21 is positive and the thyratron will fire when it is not supposed to. The function of the phase shifting network 19 is to provide a small phase shift so that the amplified signal applied to the control grid of the thyratron 21 is precisely aligned with the signal applied across the plate and cathode. If the circuit is built on a bread board, it turns out that no phase shifting circuit such as network 19 is necessary but when the circuit is placed in a casing, the network 19 is necessary probably due to stray reactance.

The circuit gives a much higher sensitivity than any circuit of the prior art with a corresponding number of components. The circuit can distinguish between one ohm change in the resistance of the thermistor 12 or in the setting of the potentiometer 14. The exact reason this extraordinary sensitivity is obtained is not known, but it is believed that the superior result is obtained because of the waveshape output from the transistor 18. The waveshape output is not the same as the input because the transistor is operated partially outside of its linear range. This effect is achieved by using a step-up transformer to supply the input of the transistor amplifier instead of a step down transformer which would normally suggest itself to be used.

The phase shifting network 19 may be substituted for by other means to perform the same function. For example, a phase shifting network may be connected between the emitter of the transistor 18 and the common connection providing the reference point for the circuit. However, the circuit is most sensitive if the phase shifting network is connected between the secondary winding 17 of the transformer 15 and the base of the transistor 18.

The above described system has been described for use as a temperature control in the process of hot drawing of nylon yarn. The system is, of course, applicable to many other control applications and particularly to other temperature control applications including those in which the control part is refrigerated instead of heated.

Many modifications may be made to the above described specific embodiment without departing from the spirit and scope of the invention, which is limited only as defined in the appended claims.

What is claimed is:

1. A temperature control circuit comprising a bridge circuit having first, second and third terminals, a thermistor connected between said first and second terminals, a resistor connected between said second and third terminals, and a potentiometer connected between said first and third terminals, means to apply an A.C. signal across said first and third terminals, a transistor connected as an amplifier, a step-up transformer having its primary winding connected to receive the A.C. signal generated between said second terminal and a movable tap of said potentiometer and having its secondary winding connected to apply the signal induced therein between the emitter and base of said transistor, a thyratron, means to apply the amplified output signal from said transistor to the control grid of said thyratron, means to apply between the plate and cathode of said thyratron an A.C. signal having a frequency equal to and a phase aligned with the frequency and phase of the A.C. signal applied across said first and third terminals of said bridge circuit, and a phase shifting network connected in the emitter base circuit of said transistor having the characteristics to shift the phase of the signal applied to the grid of said thyratron to be precisely aligned with the signal applied between the plate and cathode of said thyratron.

2. A control circuit comprising means to generate a low level A.C. signal having one phase to indicate one condition and the opposite phase to indicate a second condition, a transistor connected as an amplifier, a step-up transformer having its primary connected to receive the low level output signal from said generating means and having its secondary connected to apply the signal induced therein between the emitter and base of said transistor, a phase shifting network connected between the step-up transformer and transistor, a thyratron, means to apply the amplified output signal from said transistor to the control grid of said thyratron, and means to apply between the plate and cathode of said thyratron an A.C. signal having a frequency equal to and a phase aligned with the frequency and phase of the signal applied to the control grid of said thyratron.

3. A control circuit comprising means to generate a low level A.C. signal having one phase to indicate one condition and the opposite phase to indicate an opposite condition, a thyratron, means to apply between the plate and cathode of said thyratron an A.C. signal having a frequency equal to and a phase aligned with the frequency and phase generated by said transducing means, an amplifier connected to have the output signal of said generating means applied to its input and connected to apply its amplified output signal to the control grid of said thyratron, and means connected in the input of the amplifier to shift the phase of the signal applied to the control grid of said thyratron to be precisely aligned with the signal applied to the plate and cathode of said thyratron.

References Cited in the file of this patent

UNITED STATES PATENTS

| | | |
|---|---|---|
| 2,511,981 | Hanchett | June 20, 1950 |
| 2,556,065 | Callender | June 5, 1951 |
| 2,632,846 | Hornfeck | Mar. 24, 1953 |
| 2,761,052 | Knudsen | Aug. 28, 1956 |
| 2,795,697 | Nagel | June 11, 1957 |